DATA PROCESSING

Filed March 21, 1961 4 Sheets-Sheet 1

INVENTORS
ROBERT T. PEARSON
WILLIAM J. GORMAN
BY Joseph Weingarten
ATTORNEY

Sept. 21, 1965    R. T. PEARSON ETAL    3,208,056

DATA PROCESSING

Filed March 21, 1961    4 Sheets-Sheet 2

INVENTOR.
ROBERT T. PEARSON
WILLIAM J. GORMAN
BY Joseph Weingarten
ATTORNEY

DATA PROCESSING

Filed March 21, 1961 4 Sheets-Sheet 3

INVENTORS
Robert T. Pearson
BY William J. Gorman
Philip J McFarland
Attorneys

Sept. 21, 1965 R. T. PEARSON ETAL 3,208,056

DATA PROCESSING

Filed March 21, 1961 4 Sheets-Sheet 4

INVENTOR.
Robert T. Pearson
BY William J. Gorman
Philip J. McFarland
Attorneys

United States Patent Office 3,208,056
Patented Sept. 21, 1965

3,208,056
DATA PROCESSING

Robert T. Pearson, Beverly, and William J. Gorman, Swampscott, Mass., assignors to Laboratory for Electronics, Inc., Boston, Mass., a corporation of Delaware Filed Mar. 21, 1961, Ser. No. 97,987
4 Claims. (Cl. 340—174.1)

This application is a continuation-in-part of our application entitled Data Processing, Ser. No. 853,373, filed Nov. 16, 1959, now abandoned.

This invention relates generally to data processing apparatus and particularly to a magnetic recording device for recording, storing and reading information.

The design parameters of data processing apparatus using a magnetic recording device will, of course, be dependent upon the intended application. For example, it is known that the relative speed between the recording medium and the magnetic transducer of a magnetic recorder must be high if a high frequency or a wide-band signal is to be processed. Increasing the relative speed between a recording medium and a transducer to record such signals in turn results in an intolerable increase in the magnitude of the frictional forces if "in-contact" recording techniques are used. Consequently resort must be made to "non-contact" recording techniques wherein direct physical contact between the recording medium and the magnetic transducer is avoided. It then becomes a problem to maintain a close and constant spacing between the recording medium and the magnetic transducer in order that the sensitivity and stability of a "non-contact" recording device may be kept within tolerable limits without resort to complicated and expensive compensation circuitry. The problem, obviously, is especially acute in those practical recording devices wherein a plurality of transducers are ordinarily used.

"Non-contacting" recorders using a "pliant" disc or membrane as the recording medium have been known for some time. In certain types of such devices, a pliant recording disc is rotated in a fluid, as air, about a predetermined axis and in proximity with an annular plate. The centrifugal forces and the so-called "Bernoulli" forces on one of the surfaces of the disc produced by rotation of the disc combine to cause the disc to reach a condition of equilibrium in which the periphery of the disc is closely spaced from a surface of the annular plate. According to the art as, for example, disclosed in U.S. Patent 2,950,353, it is essential that the "pliant" disc be fabricated from a material which is free from internal stresses and bending moments.

Many unsolved problems inherent in the use of a pliant disc as a recording medium have, heretofore, prevented acceptance of any such device in the art, in spite of the apparent advantages to be gained. Perhaps the main reason for non-acceptance of pliant disc recorders has been their relatively low volume-storage efficiency as compared with other types of magnetic recorders, as the well-known drum or rigid disc recorders. That is, only the peripheral portions of known pliant discs are useful in storing signals. Further, the apparent simplicity of known pliant disc recorders does not, in practice, permit any appreciable relaxation of mechanical tolerances if satisfactory recorders are to be produced in quantity. It has been found that, if a predetermined spacing between the peripheral portions of the pliant disc and the plate is to be attained, the physical characteristics as residual internal stresses and bending moments of the disc itself and the mounting of the disc and small variations in the viscosity of the fluid are critical.

Therefore, it is an object of this invention to provide an improved magnetic recorder which utilizes automatically controlled transducer-to-recording medium separation, the transducer being fixed in position and the recording medium being movable to attain the required spacing.

Another object of the invention is to provide an improved magnetic recorder utilizing a recording medium in the form of a flexible disc whose cross-sectional shape may be changed to vary the transducer-to-recording medium distance between points on the disc and a number of transducers disposed radially of the recording medium.

Another object of the invention is to provide an improved magnetic recorder in which high frequency signals may be stored on a flexible disc having a high volume-storage efficiency.

Another object of the invention is to provide an improved magnetic recorder utilizing a flexible disc in a fluid as a recording medium, the distribution of the fluid forces on the disc being adjustable so as to compensate for variations in the physical characteristics of the disc itself, the accuracy of positioning of each one of a plurality of magnetic transducers with respect to the disc, and changes in viscosity in the fluid.

These and other objects of the invention are attained generally in a magnetic recorder using a plurality of magnetic transducers by providing a membrane-like, or flexible, disc having a magnetizable surface, supporting the disc in proximity to an annular stabilizing plate in a fluid, as air, and rotating the disc rapidly to generate dynamic and fluid forces which, in combination with the elastic forces in the disc, cause the disc to tend to assume a desired position relative to the stabilizing plate, and regulating the fluid forces acting on the disc between the disc and the stabilizing plate by throttling the fluid flowing across the surface of the disc near the stabilizing plate to adjust the pressure gradient of the fluid on the side of the disc facing the stabilizing plate, thereby forcing the disc to assume a desired cross-sectional shape so that the spacing between the disc and each one of the plurality of magnetic transducers embedded in the stabilizing plate is adjusted in accordance with the position of each transducer radially of the disc.

For a more complete understanding of the invention, reference is now made to the following detailed description of preferred embodiments of the invention, illustrated in the accompanying drawings, in which.

Figure 1:
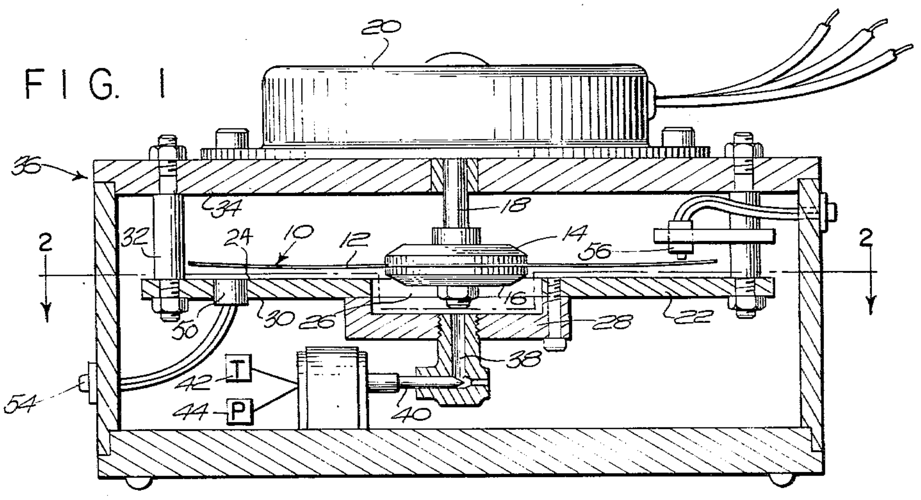
FIG. 1 is a cross-sectional view of a magnetic recording device according to the invention, the figure being greatly simplified and somewhat distorted the better to illustrate the principles of the invention.

In the figures the number 10 designates generally a preferred embodiment of the magnetic storage device of this invention. A thin, continuous elastic and plastic magnetic recording material of substantially uniform thickness, for example, a .002″ thick Mylar tape, is cut in the shape of a disc 12. A distinguishing physical characteristic of such a disc 12 is its plasticity or pliant quality causing it to be quite limp when motionless, the disc being unable to support its own weight. It should also be noted that the size of the disc is not critical to the fundamental principles related to the functioning of the device.

The disc 12 is clamped by two shaft mounting flanges 14 and 16 at the disc center. These flanges are attached directly to a shaft 18 of an electric motor 20 or any other suitably driven bearing spindle.

On one side of and close to the magnetic disc 12 there is a stabilizing back plate 22 with an adjacent smooth surface 24 and an opening 26 at the center to permit the lower flange 16 to turn inside the opening and serve as the flow control manifold.

Covering the opening 26 is a manifold cover plate 28 which is attached to the lower side 30 of the stabilizing plate 22 immediately below the opening 26. The manifold cover plate 28 is provided with a small opening 38 having an adjustable air inlet orifice valve 40 which is regulated by a thermally sensitive device 42 and a pressure sensitive device 44 both of which are indicated schematically in FIG. 1. Posts 32, affixed to the stabilizing plate 22 and an inside surface 34 of enclosure unit 36, adjustably position the stabilizing plate 22 with respect to the disc 12.

When the disc 12 rotates at a high speed near surface 24, a fluid (air) is caused to flow in through the inlet valve 40 and out at the periphery of disc 12.

As already explained, the very close spacing of the disc 12 from the surface 24 of stabilizing plate 22 is a function of a number of controlled factors. These factors include: the physical properties of the recording sheet and the diameter of the disc 12 cut therefrom; the geometry of drive flanges 14 and 16; the geometry of the manifold 21; the angular velocity of the disc, and the volume of air permitted to enter the manifold 26 through valve 40. The fluid-dynamic theory applicable to the functioning of the present invention is inherently exceedingly complex in nature; however, specific knowledge of these theoretical considerations is neither critical nor required for satisfactory utilization of the novel concepts disclosed herein. For example, disc velocity and diameter will generally be determined by the storage and readout requirements in a given application. Disc thickness is a choice amongst various commercially available magnetic recording sheet material. Flange size is a function of disc size and velocity, and the size of the manifold opening mainly depends on flange diameter.

Within very wide limits, the choice of the aforementioned parameters will yield a disc-to-plate spacing having a magnitude of .001 inch or less. Most important of all the factors which influence disc-to-plate spacing is the volume of air which is permitted to enter the manifold opening. By reducing the air admitted under the disc, the spacing under the disc will generally be reduced also.

As a consequence, close mechanical tolerances are minimized and spacing of the disc 12 relative to surface 24 becomes a function of the factors noted above, factors which are inherently more susceptible to being readily controlled with a substantial increase in ruggedness, compactness and versatility over mechancial spacing techniques. Thus, by mounting transducer devices 50 flush with the operative surface 24 of the stabilizing plate 22, the spacing of the disc 12 from these devices is maintained in a unique and simplified manner.

Figure 2:
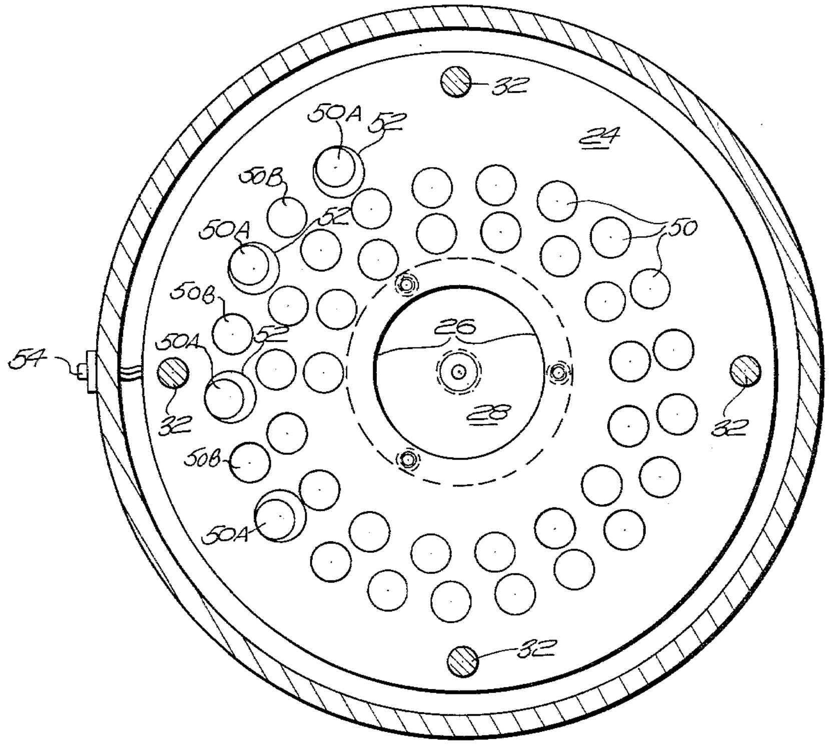
FIG. 2 is a top view taken along the line 2—2 of FIG. 1 showing a plurality of transducer elements.

A plurality of transducer devices 50 can be seen in FIG. 2 mounted in the base plate 22. Each of the devices 50 is flush with the surface 24 of the base plate 22, thereby preserving a smooth surface against which the disc 12 rotates. In the embodiment shown in FIG. 2, forty transducers or reading heads 50 are arranged in a helical array, each head reading a distinct circumferential recording track at different radii around the disc 12. In this arrangement the transducer heads 50 define recording tracks having a 25 mil width being separated by an 8 mil spacing between tracks on a four inch disc diameter. In another application some 33 tracks per inch are achieved over two inches of disc radius on a six and one-half inch disc diameter.

It will also be seen in FIG. 2 that four alternate heads 50A are eccentrically mounted in cylindrical cavities 52 in plate 22 to read the outside, peripheral track of the disc. These heads 50A employ a reading head gap somewhat longer than that of the standard writing head. Each of these four heads 50A form a pair with the transducer head 50B immediately adjacent; they are readily positionable over a small range simply by rotating and clamping the eccentric mounting unit (not shown) carrying the head. Because adjustments required after an initial setting are invariably slight, the eccentric heads 50A, when re-positioned, will have only a slight angular displacement from their optimum operating positions. The adjacent heads 50B are rotatable to compensate for any change in the position of the eccentrically mounted heads 50A. Interconnecting any pair of heads 50A and 50B forms a recirculating register which is very readily adjustable over a small range.

As will be seen in FIG. 1, the invention can also accommodate transducer elements 56 (only one of which is shown for purposes of clarity) mounted on the side of the disc 12 away from stabilizing plate 22. While the transducer heads 56 could well be identical to those imbedded in the plate 22, they could also have a different configuration as shown in FIG. 1. These upper heads 56 are provided with vertical positioning means (not shown) of any suitable commercially available variety.

The co-action of the disc 12 and surface 24, and the use of a relatively thin material for the disc, permit a unique arrangement for an extremely short loop recirculating register. For example, one of the upper heads 56 may be congruently positioned to be operatively aligned upon the same circumferential recording track as a head 50 located in the stabilizing plate 22. Suitable electrical connections (not shown in the drawings) permit signals written by head 50 to be read within a magnitude of a bit or less by the other head 56.

After an initial adjustment, re-positioning of the heads 50 which are in the stabilizing plate 22 is generally unnecessary because other parameters such as fluid volume between disc 12 and surface 24 or rotational velocity may be varied to effect a desired spacing between the medium 12 and the heads 50.

The enclosure 36 is fitted to accommodate standard electrical connectors 54 which supply each reading head 50. The enclosure 36 also protects the operative mechanism 10 therewithin from physical shock, provides electrical and magnetic shielding, and further, can be made to effectively dust-proof and contamination-proof the mechanism inside.

For very special applications, the system can utilize simple servo devices for temperature control 42 and pressure control 44 as illustrated schematically in FIG. 1. These devices alter the flow of fluid under the rotating disc 12 to compensate for external change of basic fluid or gas properties. For example, the viscosity of air increases with an increase in temperature which would tend to increase the disc 12 to stabilizing plate surface 24 separation at a fixed flow rate. Here, the temperature sensitive element would decrease the inlet orifice 38 and maintain the separation constant automatically. It should be emphasized, however, that in many applications there is no need to employ a variable orifice 38; a simple fixed orifice opening will generally function satisfactorily.

Figure 3:
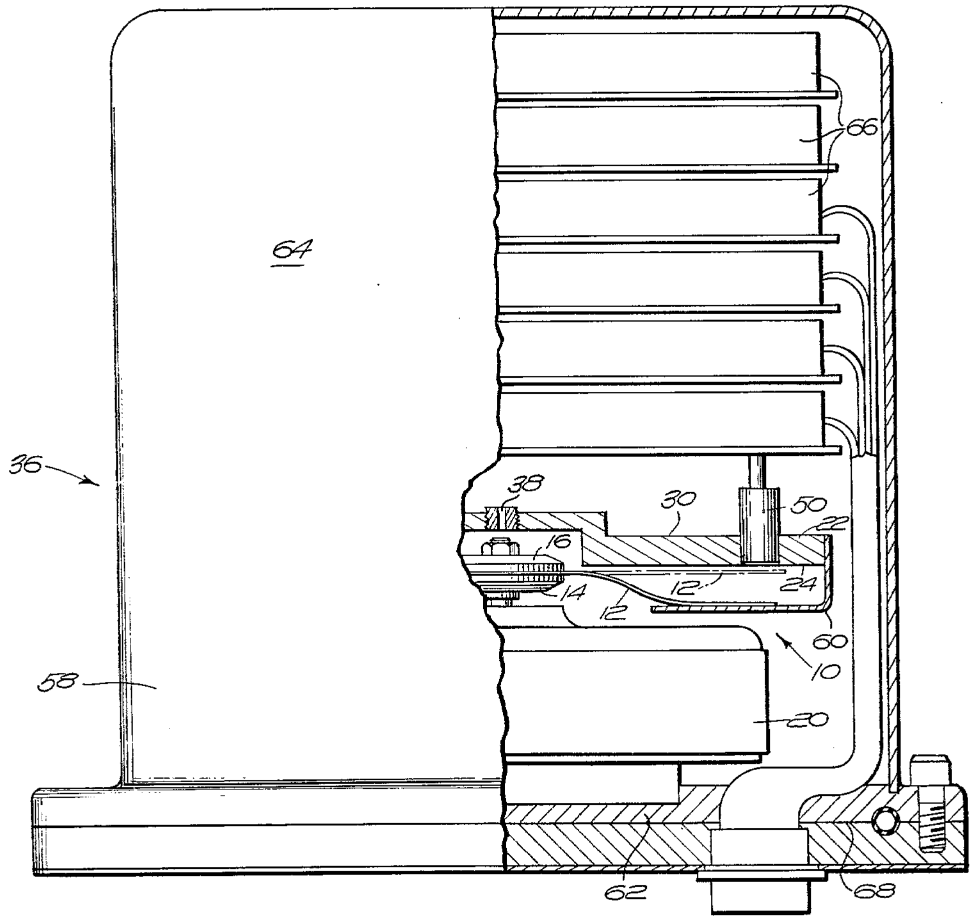
FIG. 3 illustrates an integrated data storage system, greatly simplified, showing the position of the recording assembly and the relationship of magnetic recording apparatus with respect to amplifier circuits normally associated therewith.

FIG. 3 illustrates how a disc assembly 10 may be packaged in a single integral housing 58 with other components of a memory system. In this application of the preferred embodiment of the invention the disc 12 is located below the stabilizing plate 22 and above the drive motor 20. A plurality of read-write heads 50 are positioned in the stabilizing back plate 22, but for clarity in the drawing only one is shown. Because the non-rotating disc 12 is very plastic, particularly in an elevated temperature environment, a non-operating storage guard 60 for the tape is provided. FIG. 3 actually shows the disc 12 in a non-operating attitude at rest on its storage guard 60. This figure illustrates the important non-operational aspect of the tape's pliant and non-self-supporting physical characteristics.

In order to preserve the clarity of FIG. 3, the transducer head 50 is only shown substantially co-planar with the surface 24. However, because the disc 12 when motionless is limp and falls away from the plate 22, it becomes feasible to utilize transducer heads 50 which protrude somewhat beyond the surface 24 of the stabilizing plate 22. This configuration becomes useful when the power input to the rotational drive means 20 is necessarily limited; the closer the disc 12 must be in respect to surface 24, the more power is required. Consequently, if a 1 mil spacing between transducer heads 50 and the disc 12 is desired, this can be achieved by placing the operative portion of the transducer head 2 mils above surface 24 and rotating the disc 3 mils from that surface. This yields the 1 mil spacing desired at a substantial reduction in power required to rotate the disc 12.

The motor 20 is provided with an effective heat sink type mounting platform 62 to which a canister type housing enclosure 64 is detachably mounted. Besides the disc assembly 10 the enclosure unit 58 embraces a stack of electronic cards 66 which are readily replaced as units if replacement is ever required. It is to be understood however, that the electronic cards 66 form no part of the present invention and are illustrated only to assist in the description of the invention.

A vacuum seal is formed at 68 to ensure that the air density and the air mixture within the enclosure 64 remain substantially constant. As noted previously, in some applications it may be advantageous to use a controlled gas density or mixture of certain gases within the sealed enclosure 64.

The preferred embodiment illustrated in FIGS. 1–3 show the manifold 26 and orifice 38 at the center of stabilizing plate 22. This location is definitely not critical for the proper operation of the system 10. An off-center location is feasible for manifold and orifice, in fact, each transducer 50 would have an aperture through which the environmental fluid would circulate into the space between the disc 12 and surface 24.

Another variation to which the system is readily adapted has already been suggested. A number of discs 12 can be arranged by simple stacking, to be driven by the same rotational drive motor 20.

Again, while the surface 24 has been described as smooth, the fact that it is also flat in the present embodiment is not a necessary limitation on the configuration for other applications. Because the disc 12 is elastic and pliant, it readily conforms to the shape of the surface 24 of the stabilizing plate 22. Therefore, the use of a smooth concave surface 24 will be fairly embraced by the principles governing the operation of this invention.

Figure 4:
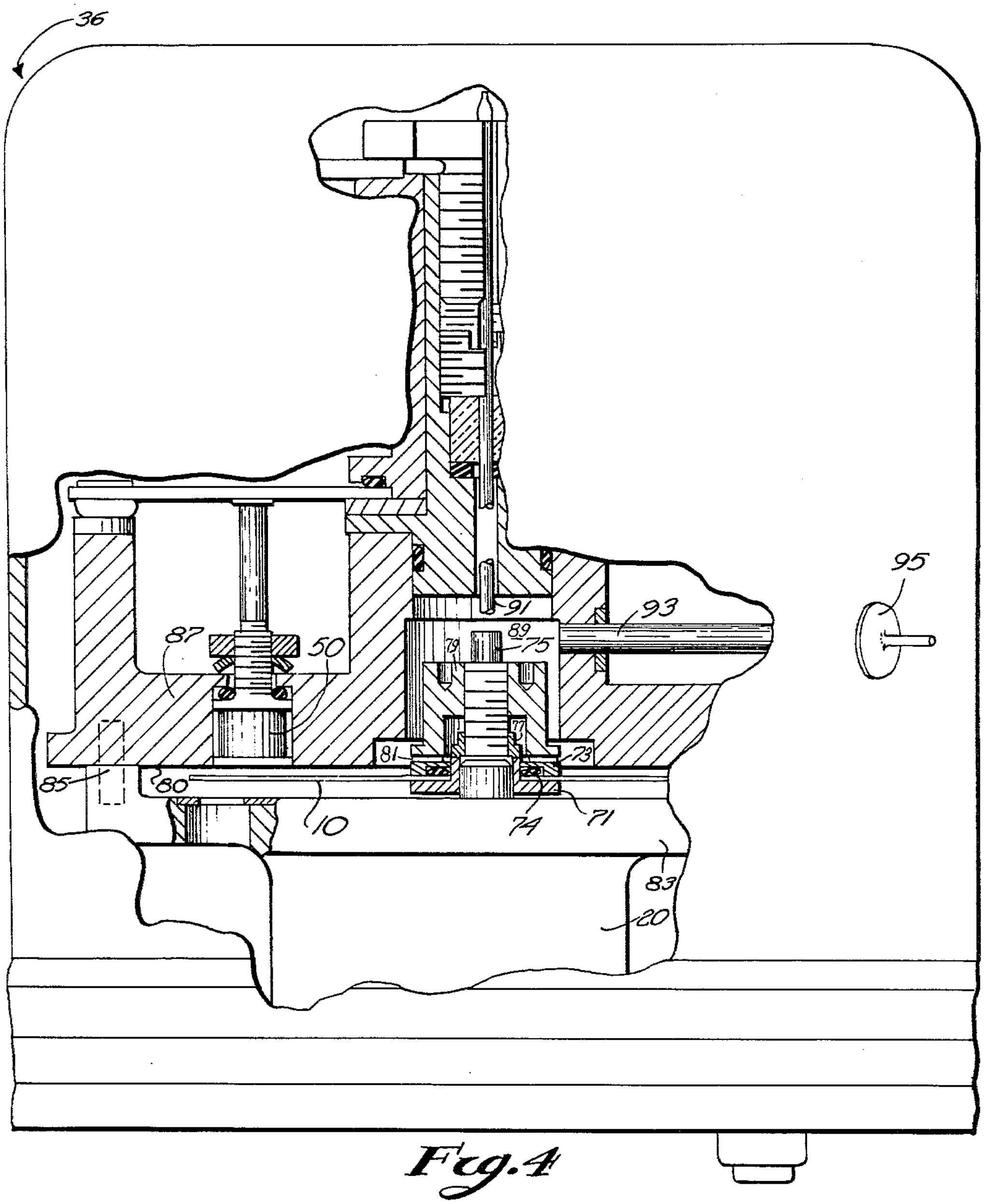
FIG. 4 is a cross-sectional view of an alternative form of an integrated data storage system similar to the system shown in FIG. 3, partially broken away and simplified the better to show the manner in which fluid pressure operating on a flexible recording disc may be adjusted.

Referring now to FIG. 4, it may be seen that many of the elements of the apparatus illustrated in FIG. 3 are used in the apparatus illustrated in FIG. 4. For convenience the elements common to FIG. 3 and FIG. 4 are those elements which perform essentially the same functions in FIG. 3 and FIG. 4 are identified by the same numerals in the figures.

A disc 12 is secured between a pair of flanges 71, 73, an air-tight connection being made between the flanges 71 and 73 and the disc 12 by means of a compressible ring 74. The flanges 71, 73 are connected to a shaft 75 of a motor 20 by means of a locking ring 77 threaded on the shaft 75 as shown and pinned, or otherwise attached, to the flanges 71, 73. An adjusting ring 79 is also threaded on the shaft 75, the inner end of the adjusting ring being spaced from the upper surface of the flange 73 by means of a shim 81. The motor stator is attached by any convenient means to a spider 83, the peripheral portions of the latter in turn being secured in any convenient manner, as by a number of pins 85 (one of which is shown toward the left hand side of FIG. 4), to a stabilizing plate 87 having a reference surface 88. Stabilizing plate 87 is adapted to mounting a plurality of magnetic transducers (only one of which is illustrated and indicated by numeral 50) so that each transducer is flush with the reference surface 88. A manifold 89 is formed at the center of the stabilizing plate 87, the dimensions of manifold 89 being greater than the dimensions of the flange 73, the adjusting ring 79 and the shim 81 which fit inside the manifold 89. A hollow pipe 91 and a tube 93 are connected to the manifold 89, the end of pipe 91 removed from manifold 89 opening into the interior of the enclosure unit 36 and the further end of the tube 93 terminating in a fluid connection 95. The latter element preferably is mounted on the side of the enclosure unit 36 and has associated therewith a shut-off valve (not shown) to close the tube 93 off from the atmosphere outside the enclosure unit whenever desired.

When the motor 20 is energized so as to cause the flexible disc 12 to rotate, a boundary layer of the molecules of air close to the surface of the disc 12 is also rotated at substantially the same circumferential velocity proportional to the distance of each molecule from the axis of rotation. Consequently, centrifugal forces are generated to force the molecules of air in the boundary layer to spiral outwardly and cause air to be moved from the manifold 89 through the opening defined by the reference surface 80 and the disc 12 and into the interior of the enclosure unit 36. This movement of air creates a partial vacuum in the manifold 89 which may be measured by connecting a measuring device (not shown), as a manometer, to the fluid connection 95. When a desired partial vacuum is drawn in the manifold 89, the upper end of the pipe 91 may be deformed, as by pinching or in any other convenient manner, so as to throttle the air entering manifold 89 to maintain any desired partial vacuum in the manifold 89.

It will be observed that the annular space between the adjusting ring 79 and the manifold 89 and the spacing between the disc 12 close to the outer edge of the flange 73 and the inner edge of the reference surface 88 may each be fixed to throttle air moved out of the manifold 89 during operation, thereby finally adjusting the rate of flow of air outwardly between the disc 12 and the reference surface 88. It is self evident that either, or both, of the just-mentioned spaces may be adjusted to accomplish throttling. The area of the annular space between the adjusting ring 79 and the manifold 89 preferably is fixed during assembly of the device by means of the shim 81 and the initial distance between the disc 12 and the reference surface 8 (sometimes referred to as the "hub height") preferably is fixed by positioning the locking ring 77 on the shaft 75.

Figure 5:
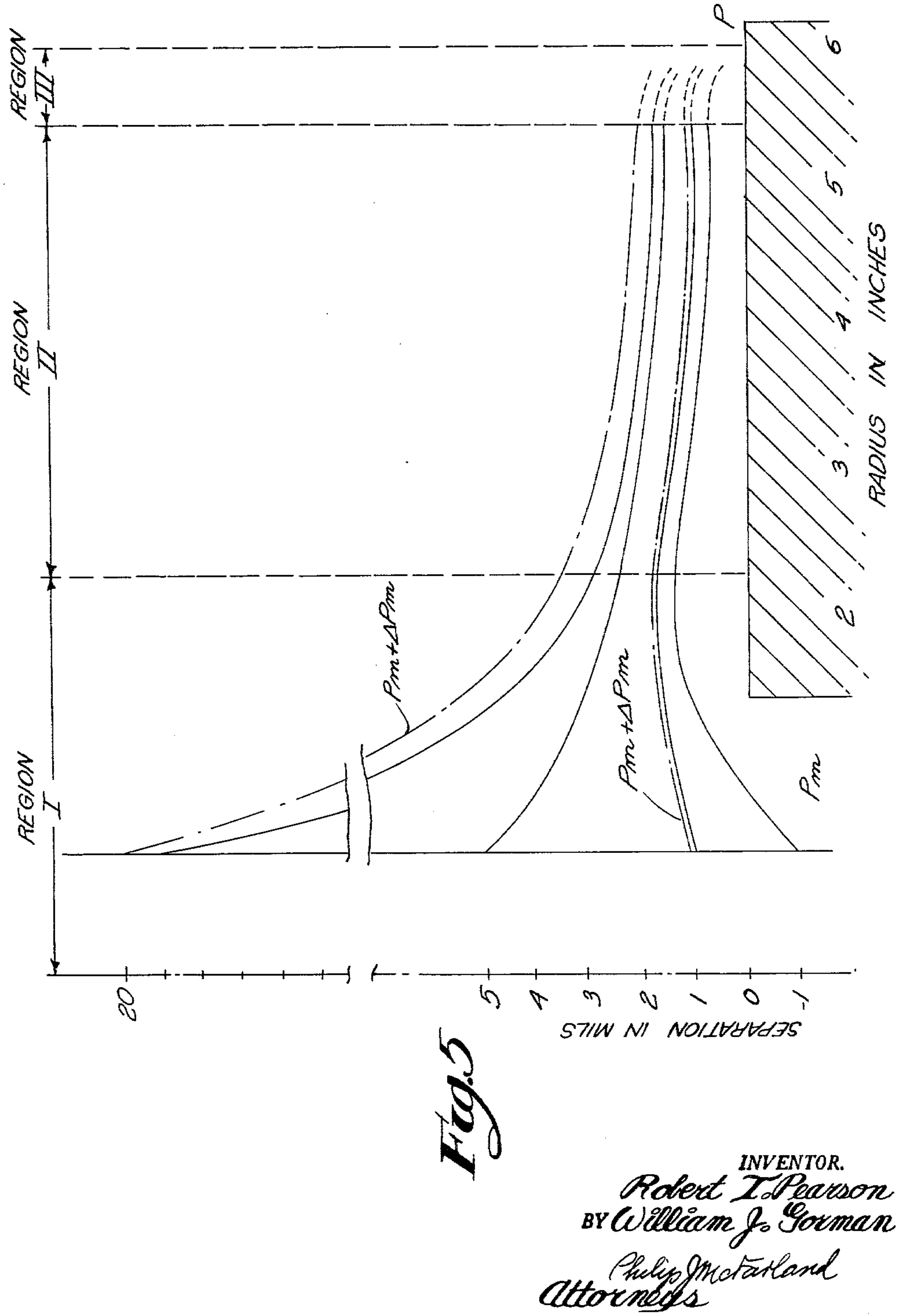
FIG. 5 is a diagram illustrating the effect of throttling on the fluid forces on a flexible recording disc as reflected in changes in the cross-sectional shape thereof.

Particularly interesting and unexpected effects are obtained when, with a fixed partial vacuum in the manifold 89 and a fixed spacing between adjusting ring 79 and the manifold 89, the hub height is varied. The effects referred to are illustrated in FIG. 5 wherein it may be seen that the cross-sectional shape of a flexible disc may conveniently be divided into three zones, or regions, marked I, II, and III. Region I is the hub boundary region and, typically, extends radially outwardly from the periphery of the flanges 71, 73 for a distance approximately twice the radius of the flanges 71, 73. Region II is the region in which recording is preferably accomplished, and Region III is a peripheral region in which a particular shape of disc is difficult to predict.

Before considering the individual regions in any detail, it will be observed in FIG. 5 that the minimum spacing between the disc and the stabilizing plate, when $P_m$ (the fluid presssure of the fluid entering between the stabilizing plate and the disc) is constant, is a function of hub height. When the hub height is, in the illustrated case, below approximately .005″, the minimum separation is very greatly affected by hub height. When the hub height is above approximately .005″, the minimum separation is relatively insensitive to changes in that dimension. On the other hand, as indicated by the curves in broken line in FIG. 5, the effect of changes in $P_m$ (that is when, for example, the pressure of the fluid is changed by an amount equal to $\Delta P_m$) is greater when the hub height is above approximately .005″ and is almost indiscernible when the hub height is below approximately .005″.

The shape of a flexible disc in the hub boundary region, Region I, is important in that such shape effects on the shape of the remaining portions of the disc, especially the shape of Region II. Further, as may be seen in FIG. 5, the shape of the disc in the hub boundary region may be changed radically by changes in either hub height or in fluid pressure, making it evident that, in a practical case, a designer must either compromise or provide auxiliary means to ensure maintenance of either hub height or fluid pressure.

The shape of the disc in Region II, the most useful recording region, is, as may be seen, almost independent of changes in either fluid pressure or hub height. It will be observed however that those parameters do, affect the separation of the disc from the back plate. It will also be observed that the slope of the disc in Region II is not ideal for recording. That is, the separation of points on the disc from the back plate is an inverse function of radial distance. Such a variation is opposite in sense to the ideal variation wherein separation should be directly proportional to radial distance. This non-compliance to the ideal curve may, however, be compensated in any known ways, as by increasing the sensitivity of the magnetic transducers as a function of their radial positions or by adjusting the sensitivity of the individual amplifiers associated with each magnetic transducer.

The shape of the disc in Region III has been shown in dotted lines, not because such shape has not been determined in many experiments, but because such shape depends to a large extent on considerations other than $P_m$ and hub height. It is believed that the characteristic curl of the disc in Region III is the result primarily of internal stresses and bending moments in the disc material. Obviously, too, the curvature of the disc in Region III is also a function of the angular velocity at which the disc is rotated and the radius of the disc, both of which affect the magnitude of the centrifugal forces on the disc. Since the shape of the disc and the separation of each point on the disc from the back plate in Region III is constant once equilibrium is reached, it is evident that recording may also be accomplished in Region III if the same care is taken to provide for variations in sensitivity as noted hereinbefore.

It will be noted in passing that although no means have been ilustrated here to vary the amount of air flowing through the pipe 91 in accordance either with the pressure or the temperature of such air means to accomplish this end could easily be incorporated if extremely close control of the position of the disc is desired. However the simple adjustment means illustrated here has proven adequate in a practical operating device.

Although the various illustrated embodiments of the invention have utilized a self-induced partial vacuum in the manifold to establish a fluid pressure differential across the flexible disc a moment's reflection will make it clear it is not essential that there be a partial vacuum in the manifold in order to adjust the cross-sectional shape of the disc. That is since the invention contemplates the establishment of a differential fluid pressure from one side of a flexible disc to the other it may be found advantageous on occasion to connect a compressor to the manifold so as to make the pressure there higher than the environmental fluid. For example, when a gas such as air is used as the fluid and the environmental conditions are such that the air normally is atmospheric pressure an air compressor could easily be connected so as to deliver air at a pressure higher than atmospheric pressure to the manifold. Experience has proven that when this is done the cross-sectional shape of the disc may be adjusted.

Since other variations of this preferred embodiment of the invention will now be apparent to those skilled in the art, it is not our intention to confine the invention to the precise form herein shown but rather to limit it in terms of the appended claims.

What is claimed is:

1. A magnetic recorder in which a gap between a magnetic recording medium and each one of a plurality of radially disposed magnetic transducers may be varied comprising, a flexible magnetic recording disc, a plurality of magnetic transducers and a stabilizing plate immersed in a fluid, means for rotating said disc in proximity to said plate, means for mounting each one of said plurality of magnetic transducers flush with the face of said plate at a different distance radially thereof, and means for regulating the fluid passing between said disc and said stabilizing plate and said plurality of magnetic transducers, said last named means including a thermally sensitive valve and a throttle valve to regulate the pressure of the fluid entering between said disc and said stabilizing plate.

2. Apparatus for controlling the cross-sectional shape of a membrane rotating in a fluid, comprising, means for supporting said membrane centrally thereof and rotating said membrane about an axis substantially perpendicular thereto, a stabilizing plate having a surface adjacent to a first surface of said membrane, and substantially perpendicular to the axis of rotation of said membrane, means for admitting fluid into the channel defined by said first surface of said membrane and said surface of said stabilizing plate to establish a differential in fluid pressure between the two sides of said membrane, and means for regulating the pressure of said fluid passing through said means for admitting fluid, said means for regulating the pressure of said fluid comprising manifold means, inlet regulating means for transmitting said fluid at a controlled rate into said manifold means and outlet means connecting said manifold means with said channel, the pressure of said fluid in said manifold means being less than the pressure of said fluid entering said inlet regulating means, and said outlet means is an annular opening between said channel and said manifold means, the outer edge of said annular opening being defined by a wall of said manifold means and the inner edge of said annular opening being defined by a wall of said means for supporting said membrane, the distance between said wall of said manifold means and said wall of said means for supporting said membrane being adjustable to regulate the pressure of said fluid passing through said outlet means.

3. Data storage apparatus comprising a flexible magnetic recording disc attached at its center to an axial shaft, means for rotating said shaft and disc, a stabilizing plate having a surface close to and coextensive with said disc when said disc is rotated, magnetic transducer means close to said disc when it is rotating for exchanging signals therewith, manifold means for confining an environmental fluid such as air, inlet regulating means for transmitting said fluid at a controlled rate into said manifold means, and outlet means connecting said manifold means with the space between said plate and said disc through which said fluid flows when said disc is rotated, said inlet regulating means comprising a valve for controlling the rate of fluid flow into said manifold, and means coupled thereto for detecting changes in the characteristics of the environmental fluid and for controlling said valve in accordance therewith to compensate for said changes.

4. Apparatus according to claim 2 including a plurality of magnetic transducers mounted in said stabilizing plate, at least one of which is carried in a rotatable well having an eccentric axis of rotation.

References Cited by the Examiner

UNITED STATES PATENTS

| | | | |
|---|---|---|---|
| 2,899,260 | 8/59 | Farrand et al. | 340—174.1 X |
| 2,950,353 | 8/60 | Fomenko | 340—174.1 X |
| 3,001,850 | 9/61 | Marrs | 340—174.1 X |
| 3,108,259 | 10/63 | Perkins et al. | 340—174.1 |
| 3,110,889 | 11/63 | Morley | 340—174.1 |
| 3,131,395 | 4/64 | Lekas | 340—174.1 |

IRVING L. SRAGOW, *Primary Examiner.*

STEPHEN W. CAPELLI, *Examiner.*